Jan. 16, 1951  R. E. JENNINGS  2,538,003
SKID INDICATOR
Filed Nov. 21, 1946  2 Sheets-Sheet 1
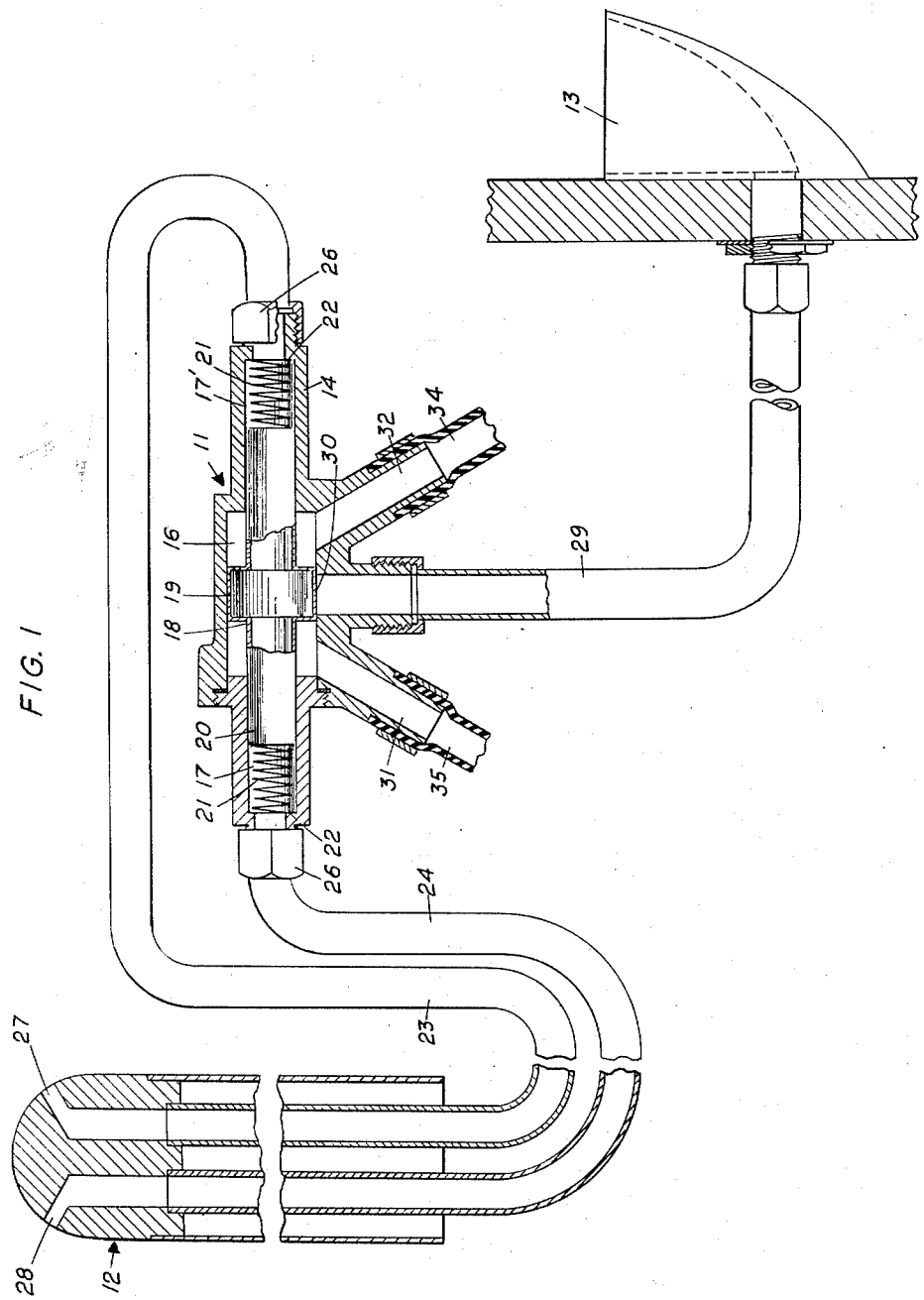
INVENTOR
RALPH E. JENNINGS
BY
ATTORNEY

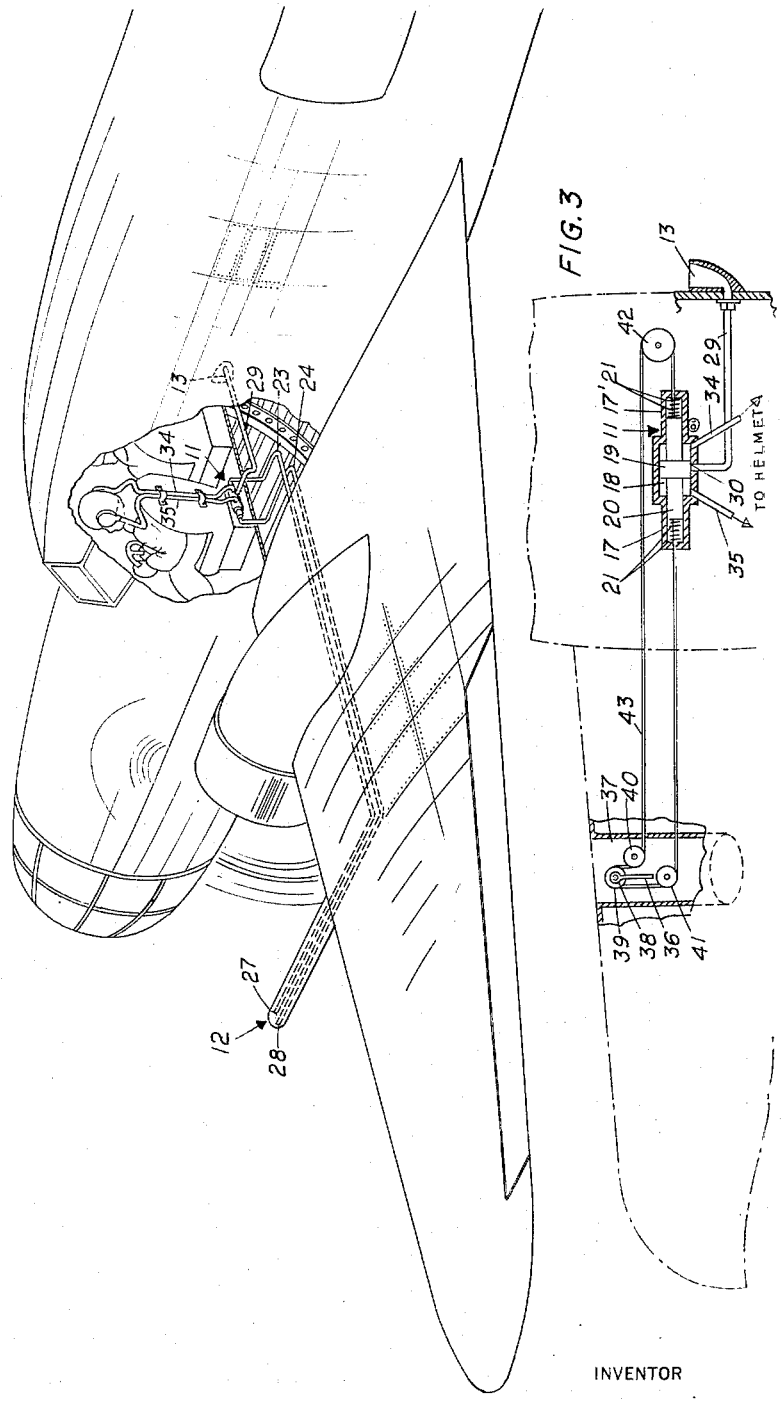

Patented Jan. 16, 1951

2,538,003

UNITED STATES PATENT OFFICE 2,538,003

SKID INDICATOR

Ralph Edward Jennings, United States Navy,
Washington, D. C.

Application November 21, 1946, Serial No. 711,337

9 Claims. (Cl. 73—180)

(Granted under the act of March 3, 1883, as amended April 30, 1928; 370 O. G. 757)

This invention relates generally to instruments adapted to furnish a perceptible indication of any transverse motion in a fluid medium of a moving body; particularly, the invention relates to skid indicators for aircraft.

It is well known that bombing accuracy is decreased when the aircraft is in a "skid" at the moment of release, the reason being that, under skidding conditions, the flight path of the aircraft (along which the bomb will drop) is not the same as the line of sight from plane to target. This error is not introduced when the aircraft is in a properly coordinated, or banked, turn at the moment of release since the line of sight in such turns will be tangent to the line of flight of the aircraft.

An instrument capable of informing the pilot or bombardier of even the slightest skidding of his aircraft is, therefore, of great value both in training and in actual bombing operations, and it is to such an instrument that the present invention is directed.

Accordingly, an object of the invention is to provide a device which will indicate even a slight diversion of the aircraft from its heading in an air mass.

Another object of the inventon is the provision of such a device which will depend for its operation upon an air pressure differential produced between the branches of a conventional yawhead or other pressure responsive device under skidding conditions.

An additional object is to provide a lightweight skid indicator which may be easily and inexpensively constructed and installed in an aircraft and which will require a minimum of care in maintenance.

Other and further objects and advantages of the invention, and the manner in which they may be attained, will become apparent from the following detailed description when read in connection with the drawings forming a part of this specification.

In the drawings:

Fig. 1 is a longitudinal sectional view of the skid indicator of the invention, showing its relation to a yawhead and a Pitot scoop, and the manner in which it cooperates with these parts.

Fig. 2 is a schematic drawing of an installation of the skid indicator in an airplane, and shows one means by which knowledge of a skid is conveyed to the pilot.

Fig. 3 is a modification of the invention and illustrates the use of a vane and pulley system to operate the skid indicator.

In a preferred form of the invention shown particularly in Fig. 1, a selector valve 11 is operationally interposed between the branches of a yawhead 12, and coupled by a tube connection to a pressure source, as Pitot scoop 13. The selector valve 11 comprises a casing 14, a central chamber 16 of relatively large cross-sectional area, and end sockets 17 and 17'. A plunger 18 having a central seat portion or partition member 19 intermediate projections 20 thereof is positioned within the casing 14 in slidable engagement with the walls of chamber 16 and the sockets. Coiled springs 21 disposed between the projections 20 of the plunger and shoulders 22 at the extremities of sockets 17, 17', serve to maintain the plunger 18 centralized within chamber 16 as shown. Connector tubes 23 and 24 are attached to the ends of casing 14 opposite sockets 17, 17' by any convenient means, as conventional gas fittings 26, thus establishing communication between the sockets and the Pitot openings 27 and 28 of yawhead 12. Chamber 16 and sockets 17, 17' are preferably circular in cross-section; the sockets, additionally, are equal in cross-sectional area so as to assure proper centering of plunger 18 when the pressures in sockets 17 and 17' are of equal magnitude.

Yawhead 12 is designed to be attached to the leading edge of a wing of an airplane in a horizontal plane and with its longitudinal axis parallel to the longitudinal axis of the airplane. The Pitot openings 27 and 28 are inclined at equal angles on opposite sides of the longitudinal axis of the yawhead so that any movement of the yawhead tending to align one of the Pitot openings with the relative wind, which is an incident of skidding, results in a differential pressure between the two Pitot openings. These pressures, of course, are transmitted through tubes 23 and 24 to sockets 17 and 17' at opposite ends of plunger 18 and, where a pressure differential exists, plunger 18 will be translated in the direction of the lower pressure.

Pitot scoop 13 is attached externally of the aircraft and with its scoop opening forward in the slip stream, thus maintaining air at high pressure in the tube 29 which connects the Pitot scoop with the selector valve 11. The inlet 30 from the Pitot scoop is normally closed by the seat portion 19 of the plunger and may introduce air under pressure into chamber 16 only when the plunger is displaced in either direction due to a pressure differential in the sockets 17, 17'. Ports 31 and 32 communicate with chamber 16 on either side of the seat portion 19 and are adapted to conduct away any gases introduced into chamber 16 through the inlet 30 when the plunger 18 is moved in either direction away from inlet 30.

Thus, it is seen that the selector valve 11 may function as a servo mechanism, delivering relatively large quantities of air through ports 31 and 32 where only relatively small differences in pressure exist between sockets 17 and 17', and it is obvious, furthermore, that the yawhead may be so connected with the selector valve that the direction in which the aircraft is skidding may be indicated by delivery of air from the Pitot scoop to either of the ports 31 or 32.

Since delivery of a pulse of air through either of the ports 31 or 32 has a directional significance with reference to skid, such air pulses may be utilized to notify the pilot of the direction of a skid when it exists. I prefer to employ these air pulses directly by conducting them by any convenient means, as by air lines or conduits 34 and 35, to a remote point of application such as the interior of the pilot's helmet which is the common terminal of said conduits, so that a skid in any direction will result in a corresponding gentle blast of air on the corresponding cheek.

Referring now to Fig. 2, the yawhead 12 is mounted in the leading edge of the port wing of an aircraft and the Pitot openings thereof are connected by means of tubes 23 and 24 to the opposite ends of the selector valve 11. Pitot scoop 13 may be attached to any convenient exterior surface of the aircraft; in Fig. 2 the Pitot scoop is shown secured to the exterior wall of the cabin.

In the modification shown in Fig. 3, the yawhead is replaced by a vane 36 positioned in a passage 37 in the aircraft wing and pivoted at its forward end, as at 38; thus the vane at all times aligns itself with the relative wind. A pulley 39 which is fixed to the vane, cooperates with pulleys 40, 41 and 42, and cable 43 to transmit any rotary motion of the vane to the plunger 18 of the selector valve 11. When the aircraft skids, the vane 37 is rotated, displacing the plunger 18 through the system of cables and pulleys; the skid is then indicated to the pilot as above described.

Operation of the skid indicator illustrated in Figs. 1 and 2 is extremely simple and reliable. Consider an installation in which the yawhead 12 is mounted in the left wing and the Pitot scoop 13 is attached to the right side of the fuselage, substantially as shown in Fig. 2. A skid to the left will result in a higher pressure in Pitot opening 28 than that in Pitot opening 27; these pressures are transmitted respectively to sockets 17 and 17' and, since the pressure in socket 17 will be greater than that in socket 17' plunger 18 will be displaced in the direction of socket 17' until the pressures in both sockets are equal. This displacement of plunger 18 permits air under pressure from Pitot scoop 13 to enter chamber 16 whence it is conducted through port 31 and flexible tube 35 to the left side of the pilot's helmet where it blows against the left side of the pilot's face informing him that he is skidding to the left.

The Pitot scoop employed with the skid indicator may be the conventional ventilator scoop; this scoop is adjustable to meet the air stream at any pre-determined angle and, since such adjustment will affect the air pressure in delivery tube 29, the pilot has a control over the sensitivity of the skid indicator. When the signal air delivered by the Pitot scoop is cold and may dull the sensitivity of the areas impinged, provision for heating the air by any suitable means may be made.

It is obvious that the signal air delivered from the selector valve may be employed in a number of ways to convey knowledge of a skid to the pilot, and although I prefer to employ the air signals directly by causing them to impinge upon some portion of the pilot's body, thus making use of his sense of touch, use of such signals to create a secondary signal perceptible to the pilot by any of his other senses is within the contemplation of the present invention. Therefore, while what has been described herein is particularly illustrative of a presently preferred embodiment of my invention, it is not intended that the scope of the invention be limited thereto but that it embrace any modifications and changes which fall within the true spirit of the invention, as covered by the appended claims, occurring to those skilled in the art.

The invention herein described may be manufactured and used by or for the Government of the United States of America for governmental purposes without the payment of any royalties thereon or therefor.

I claim:

1. A skid indicator for aircraft comprising a yawhead having at least two openings to the atmosphere, a valve casing having a chamber operationally interposed between said openings, said openings communicating with opposite ends of said chamber, a partition member disposed within said chamber and movable in response to pressure differences between the ends thereof, a source of fluid pressure having an inlet communicating with the chamber medially of its ends, means tending to maintain said partition member in closing position over said inlet, a pair of conduits respectively extending from said chamber at opposite sides of said partition to a remote point, means carried by said partition member separating said fluid pressure inlet and said conduits from said opposite ends of the chamber, and outlet means constituting the common terminal of said conduits at said remote point.

2. A skid indicator for aircraft comprising a yawhead having at least two openings to the atmosphere, a valve casing having a chamber operationally interposed between said openings, said openings communicating with opposite ends of said chamber, a plunger in the casing being movable in response to pressure differences between said ends and having a partition member disposed within said chamber, a source of fluid pressure having an inlet communicating with the chamber medially of its ends, means acting on the plunger to tend to maintain said partition member in closing position over said inlet, a pair of conduits respectively extending from said chamber at opposite sides of said partition to a remote point, means carried by said partition member separating said fluid pressure inlet and said conduits from said opposite ends of the chamber, and outlet means constituting the common terminal of said conduits at said remote point.

3. A skid indicator for aircraft comprising a yawhead having at least two openings to the atmosphere, a valve casing having a chamber operationally interposed between said openings, said openings communicating with opposite ends of said chamber, a partition member disposed within said chamber and movable in response to pressure differences between the ends thereof, a source of air pressure, including a Pitot scoop, having an inlet communicating with the chamber medially of its ends, means tending to maintain said partition member in closing position over said inlet, a pair of conduits respectively extending from said chamber at opposite sides of said partition to a remote point, means carried by said partition member separating said fluid pressure inlet and said conduits from said opposite ends of the chamber, and outlet means constituting the common terminal of said conduits at said remote point.

4. A skid indicator for aircraft comprising a yawhead having two openings to the atmosphere, a valve casing having a central chamber of enlarged diameter and end portions of reduced diameter, said casing being operationally interposed between said openings, said openings communicating with said end portions of said casing, a piston having an intermediate portion of enlarged diameter disposed within said casing such that the end portions of said casing are separated from said central chamber by said piston, said piston being movable in response to air pressure differences between the ends thereof, a source of air pressure having an inlet communicating with said central chamber and normally adapted to be closed by said intermediate portion of said piston but adapted to introduce air into said chamber on one side of said piston when the latter is moved in either direction, means acting on the piston to tend to maintain said enlarged intermediate portion over said inlet a pair of conduits respectively extending from said chamber on opposite sides of said enlarged portion of said piston to a remote point, and outlet means constituting the common terminal of said conduits at said remote point.

5. The skid indicator set forth in claim 1 in which the openings adjacent the atmosphere are equally diverted from an axis parallel to the longitudinal axis of the yawhead, whereby rotation of said yawhead about a vertical axis produces a pressure differential between said openings.

6. A skid indicator for aircraft comprising a pivotal vane adapted to align itself with the relative wind of the aircraft, a pulley fixed to said vane at its pivot point, a valve casing having a chamber, a plunger movable within said chamber, a cable cooperating with said pulley and connected to opposite ends of said plunger whereby deflection of the vane on its pivot and consequent rotation of said pulley results in a corresponding movement of said plunger terminating at an inlet in said casing and, a source of air pressure normally adapted to be closed by said plunger, a pair of conduits respectively extending from said chamber at opposite sides of said plunger to a remote point and respectively receiving an influx of air from said source as the inlet is uncovered by the plunger upon said plunger movement, and outlet means constituting the common terminal of said conduits at said remote point.

7. A skid indicator for aircraft comprising means directed into the relative wind of the aircraft and operative to effect a wind impulse in response to an air pressure differential between the sides of said means, a valve casing, valve means in said casing movable in response to said pressure differential, a pressure line to conduct a portion of the aircraft slip stream to the valve means for distribution, and means to which said slip stream portion is conducted through distribution by said valve means to produce a signal capable of affecting one of the human senses.

8. A skid indicator for aircraft comprising means directed into the relative wind of the aircraft and having diversely directed openings operative to produce a signal in response to an air pressure differential between the sides thereof at which said openings occur, a valve casing having a chamber the opposite ends of which are operatively connected with the respective openings, a plunger disposed within said chamber having its ends confronting said chamber ends and movable in said chamber in response to pressure differentials at said ends, a source of air pressure terminating at an inlet in said casing and normally adapted to be closed by said plunger, a pair of conduits respectively extending from said chamber at opposite sides of said plunger to a remote point, means partitioning said air pressure inlet and said pair of conduits from said opposite ends of the chamber, and outlet means constituting a common terminal of said conduits at said remote point.

9. An operator-controllable vehicle progressively movable in a fluid medium, means on the vehicle for deflecting a portion of the fluid slip stream produced by the heading movement of the vehicle in said medium to provide a pressure source, pressure means responsive to the diversion of the vehicle from its heading, and means actuated by said pressure means for selectively orienting and conducting said deflected fluid portion to a point of application for affecting at least one of the senses of the operator.

RALPH EDWARD JENNINGS.

REFERENCES CITED

The following references are of record in the file of this patent:

UNITED STATES PATENTS

| Number | Name | Date |
|---|---|---|
| 1,107,298 | Haas | Aug. 18, 1914 |
| 1,638,101 | Roucka | Aug. 9, 1927 |
| 2,029,700 | Boykow | Feb. 4, 1936 |
| 2,237,306 | Hood | Apr. 8, 1941 |
| 2,246,555 | Underwood | June 24, 1941 |
| 2,266,921 | Thanteran | Dec. 23, 1941 |